United States Patent
Barinek et al.

(10) Patent No.: US 7,127,352 B2
(45) Date of Patent: Oct. 24, 2006

(54) SYSTEM AND METHOD FOR PROVIDING ACCURATE LOCAL MAPS FOR A CENTRAL SERVICE

(75) Inventors: Michael Barinek, Park Ridge, IL (US); Daniel H. Hoskins, Jr., Boulder, CO (US); Gary Douglas Pulford, Boulder, CO (US); Douglas W. Stevens, Naperville, IL (US); David Weksel, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 387 days.

(21) Appl. No.: 10/261,385

(22) Filed: Sep. 30, 2002

(65) Prior Publication Data

US 2004/0064256 A1    Apr. 1, 2004

(51) Int. Cl.
*G01V 3/38* (2006.01)
*H04M 11/04* (2006.01)
(52) U.S. Cl. ............................................. 702/5; 379/45
(58) Field of Classification Search .................... 702/5; 379/45; 455/457; 707/104.1
See application file for complete search history.

(56) References Cited

U.S. PATENT DOCUMENTS

| | | | | |
|---|---|---|---|---|
| 5,311,569 A | * | 5/1994 | Brozovich et al. ............. | 379/45 |
| 5,544,052 A | * | 8/1996 | Fujita et al. .................... | 702/5 |
| 6,064,722 A | * | 5/2000 | Clise et al. .................... | 379/37 |
| 6,101,240 A | * | 8/2000 | Blair et al. .................... | 379/45 |
| 6,104,784 A | * | 8/2000 | Robbins ....................... | 379/45 |
| 6,256,489 B1 | * | 7/2001 | Lichter et al. ............. | 455/404.2 |
| 6,263,343 B1 | * | 7/2001 | Hirono ..................... | 707/104.1 |
| 6,415,018 B1 | * | 7/2002 | Antonucci et al. ............ | 379/45 |
| 6,453,233 B1 | * | 9/2002 | Kato .......................... | 701/208 |
| 6,501,421 B1 | * | 12/2002 | Dutta et al. ............ | 342/357.13 |
| 6,516,267 B1 | * | 2/2003 | Cherveny et al. ........... | 701/208 |
| 6,574,561 B1 | * | 6/2003 | Alexander et al. ............. | 702/5 |
| 6,584,307 B1 | * | 6/2003 | Antonucci et al. ....... | 455/422.1 |
| 6,604,046 B1 | * | 8/2003 | Van Watermulen et al. | 701/208 |
| 6,640,184 B1 | * | 10/2003 | Rabe .......................... | 701/207 |
| 6,665,611 B1 | * | 12/2003 | Oran et al. .................. | 701/213 |
| 6,721,395 B1 | * | 4/2004 | Martinez ..................... | 379/45 |
| 2003/0086539 A1 | * | 5/2003 | McCalmont et al. ......... | 379/45 |

OTHER PUBLICATIONS

"Geospatial Mapping and Navigation of the Web", McCurley, WWW10, May 1-5, 2001, Hong Kong.*
Linders, J., The Use of Structured Digital Road Network Data Bases for Dispatching and Routing of Emergency Services, 1989 IEEE, pp. A-54 to A-59.*

* cited by examiner

*Primary Examiner*—Bryan Bui
*Assistant Examiner*—Toan M. Le

(57) ABSTRACT

A system and method that provides economical and accurate data for a selected area (jurisdiction) from a centralized location by generating a base-line map from commercially available information and distributing portions of this map to local jurisdictions. Inaccuracies and other information only available locally are stored in a local database. Periodically these databases are uploaded to a central location and reconciled with the base line map. Advantageously, such reconciliation may include a rules based reconciliation wherein the geo-coordinates from the commercial vendors are used and applied to the local data. A new base line map is then generated and distributed back to the local user. In this manner, the local user has an accurate yet economical map.

27 Claims, 4 Drawing Sheets

US 7,127,352 B2

SYSTEM AND METHOD FOR PROVIDING ACCURATE LOCAL MAPS FOR A CENTRAL SERVICE

FIELD OF THE INVENTION

This invention relates to the field of geo-coordinate-based maps used by, for example, emergency calling centers and, more specifically, to a system that provides accurate, up to date maps for such applications.

BACKGROUND OF THE INVENTION

Public safety answering points (PSAP) are increasingly using sophisticated geo-coordinate-based maps to pinpoint and display the location of the originator of an emergency call and to guide emergency response units to the location. Currently, such map data is limited to fixed telephones (i.e., wireline) but in the near future must include geo-coordinates of wireless (also known as cellular) telephones making emergency calls. Several problems must be solved before such pinpoint accuracy of both wireline and wireless maps are universally available.

First of all, companies that create maps for large areas or even the entire country generate most maps to include geo-coordinates. These maps are carefully surveyed and the geo-coordinates carefully documented. However, such maps may include local inaccuracies and cannot keep up with the ever-changing landscape of a local community.

Secondly, a PSAP serves one or more jurisdictions for several services (i.e., police, fire, animal control, etc.). These local PSAP's are not concerned with the majority of the commercially available maps; they are only concerned with their particular jurisdiction. Occasionally, however, a PSAP may be called upon to cover for a non-local jurisdiction.

Thus, the economies of purchasing accurate, up to date for every possible jurisdiction quickly becomes overwhelming for small and/or rural jurisdictions.

Therefore a problem in the art is that there is currently no economical accurate map data universally available.

SUMMARY OF THE INVENTION

This problem is solved and the technical advance is achieved in the art by a system and method that provides economical and accurate data for a selected area (jurisdiction) from a centralized location. According to this invention, a base-line map is generated from commercially available information and portions of this map are distributed local jurisdictions. Inaccuracies and other information only available locally are stored in a local database. Periodically these databases are uploaded to a central location and reconciled with the base line map. Advantageously, such reconciliation may include a rules based reconciliation wherein the geo-coordinates from the commercial vendors are used and applied to the local data. A new base line map is then generated and distributed back to the local user. In this manner, the local user has an accurate yet economical map. Further, any jurisdiction may request any other jurisdiction's map; in case of an emergency situation, the jurisdiction may request the local map for whatever area it is covering for.

BRIEF DESCRIPTION OF THE DRAWINGS

A more complete understanding of this invention may be obtained from consideration of the following description taken in conjunction with the drawings in which.

DETAILED DESCRIPTION

Figure 1:
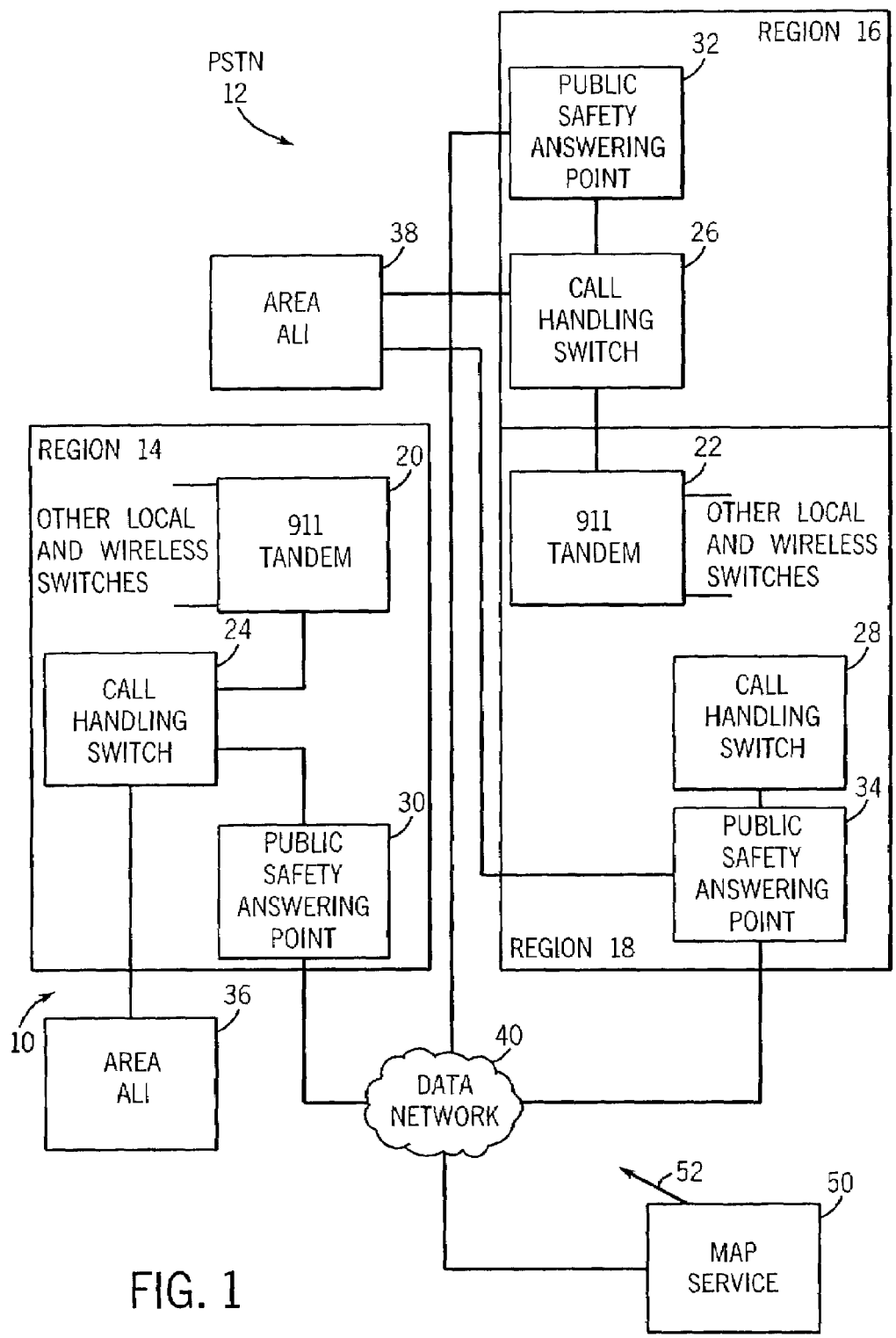
FIG. 1 is a block diagram of a public switched telephone network serving a large area in which an exemplary embodiment of this invention operates.

FIG. 1 illustrates a block diagram of one possible implementation of this invention. This invention will be described in connection with map production for Public Safety Answering Point (PSAP) usage; however, the application of this invention is much broader. In this exemplary embodiment a publicly switched telephone network (PSTN) 12 serves a geographic area 10. PSTN 12 is well known in the art and comprises a plurality of telephone switching systems, tandem systems, long distance service, wireless systems, etc.

Also in this exemplary embodiment, the geographic area of PSTN 12 is divided into three regions, region 14, region 16 and region 18. Regions 14, 16 and 18 represent, for example, jurisdictions for a fire protection district, police, animal control, etc. and/or any combination thereof. In a typical emergency telephone system (911 system) call set up, local and wireless (which is not shown, but is very well known in the art) are connected to a 911 tandem illustrated here as 911 tandem 20 and 911 tandem 22. Each 911 tandem 20 and 22 is connected to one or more call-handling switches. In this exemplary embodiment, 911 tandem 20 is connected to call handling switch 24 and 911 tandem 22 is connected to call handling switches 26 and 28. Call handling switches 24, 26 and 28 are each connected to a PSAP 30, 32 and 34 respectively. As will be described further below PSAPs 30, 32 and 34 comprise administrative and call handling facilities, as well as call answering positions.

A 911 call, (as such calls for emergency service are known) arrives, for example, in Region 14 through 911 tandem 20, which delivers the call to call handling switch 24. Call handling switch 24 delivers the call to PSAP 30, along with the calling identification number of the telephone (ANI). The PSAP requests automatic location information from call handling switch 24, 26 or 28. The request for information is routed to an area wide automatic location information (ALI) database. In this exemplary embodiment call-handling switch 24 in Region 14 is connected to area ALI 36. Call handling switches 26 and 28 are connected to area ALI 38. ALI's 36 and 38 return location information associated with the calling telephone number back to its respective call handling switch and its information is displayed on the appropriate call handling position.

Either as part of the PSTN 12, or separately, there is a data network 40, for example, the Internet which conveys data as is known in the art. According to this exemplary embodiment of this invention, a map service 50 is connected to the data network 40. Alternatively, map service 50 may be connected to PSTN 12, as shown by dash line 52. According to this invention, map service 50 provides map information for Regions 14, 16 and 18. This map information includes local roads, landmarks, names, etc., and the geo-coordinates for each. Further, each PSAP 30, 32 and 34 can keep a record of data inconsistencies of the map data provided by map service 50 and what is found in reality when attempting to dispatch local units to calling locations.

Figure 2:
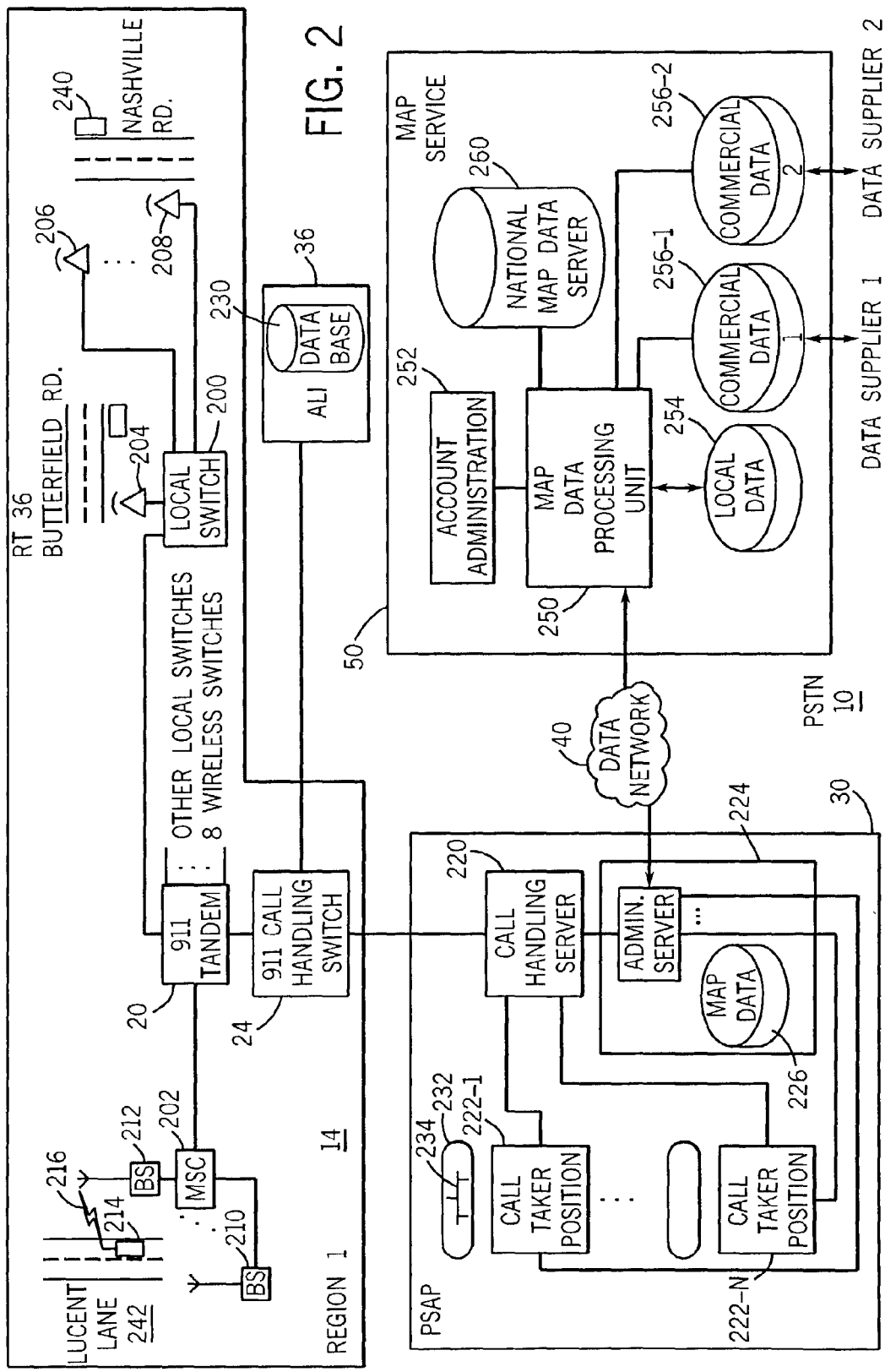
FIG. 2 is a further detailed block diagram of the operational portions of this invention in the context of FIG. 1.

FIG. 2 is a more detailed block diagram of portions of FIG. 1 illustrating more detail of region 14. Region 14 includes (from PSTN 10, FIG. 1) 911 call handling switch 24 and 911 tandem switch 20 is connected to a plurality of local switching systems and wireless systems represented by local switch 200 and wireless mobile switching center (MSC) 202. Local switch 200 serves a plurality of landline-based telephones, represented by telephones 204, 206 and 208.

MSC 202 represents a plurality of base stations 210 and 212 and serves a region, which may overlap some, all or none of the territory served by local switch 200. Base stations, such as base station 212, communicate with wireless devices, such as wireless telephone 214, via radio channels represented by 216.

PSAP 30 includes a call-handling server 220, which is connected to 911 call handling switch 24. Call handling server 220 receives 911 calls from 911 call handling switch 24 and delivers such calls to a plurality of call taker positions represented by call taker position 222-1 through call taker position 222-n.

Also connected to call handling server 220 is administration terminal 224, which is known in the art, that controls call taker positions 222-1 through 222-n. Call handling server 220 and according to this embodiment of this invention administers map data in map database 226.

In an exemplary emergency call from, for example, telephone 204, the caller of telephone 204 dials 911. Local switch 200 responds by determining the appropriate 911 tandem to which this call is directed. Local switch 200 extends the call to 911 to tandem 220 and includes the telephone number of telephone 204. 911 tandem 220 then extends the call to 911 call handling switch 24, also including the telephone number of telephone 204. 911 call handling switch 24 extends the call to call handling server 220 and call handling center 220 sets up the call to an available call taker position; in this example, call taker position 222-1. Furthermore, call handling server 220 also sends an inquiry through 911 call handling switch 24 to ALI 36. ALI 36 is an area wide server that includes ALI database 230. ALI database 230 includes information such as address and special needs associated with the received telephone number. ALI database performs its look-up in database 230 and sends information back to call handling server 220 via 911 call handling switch 24.

Such ALI information is displayed at display 232 of call taker position 222-1. According to this embodiment of this invention, call handling server 220 also queries administrative system 224 for map data 226 corresponding to the ALI information received from ALI 36. Map data 226 is displayed in graphic form in display 234.

In exemplary embodiment, it is determined that display 234 indicates that telephone 204 is located along Route 36. Further, it is determined by in the field that Route 36 has a nickname "Butterfield Road" by which it is commonly known. According to this exemplary embodiment, the operator at call taker position 222-1 records the alternate name for the road, which is sent to administrative server 224 and stored with local map data 226.

Further, if, for example, a 911 call arrives at PSAP 30 from telephone 206, call taker position 222-1 receives map information from database 226, which is displayed as display 234 on display 232. In this example, a new stoplight 240 has been installed on the road just north of the location of telephone 206. Therefore, this information is entered by the call taker at call taker position 222-1 and is stored by administrative service server 224 in map data 226.

Finally, an emergency call (911 call) may arrive at PSAP 3 from wireless telephone 214. Wireless telephone 214 send signal 216 which is received by base station 212 and delivered to MSC 202. Information is derived by MSN (or base station 212) to determine the location of mobile station 214. This data is currently required by law and therefore will not be further discussed. MSC 202 delivers the call and the data to 911 tandem 20, which delivers the call through 911 call handling switch 24 to call handling server 220, along with the geo-location of mobile station 214. Administrative server 224 determines the geo-location of base station 214 in map data 226 using, for example, latitude and longitude and causes a map, including that information, to be displayed at call taker position 222-1 on display 234. In this instance, the road on which mobile station 214 is located ("Lucent Lane") 242 is not on map 234. Therefore, the operator at call taker position 222-1 adds this information when it is available (e.g. from the emergency personnel). This data is then delivered to administrative server 224 and to map data 226. The next time any of the above locations are displayed, the new data is displayed.

According to another aspect of this exemplary embodiment of this invention, administrative server 224 periodically establishes a connection through data network 40 to map service 50. Administrative server 224 formats and up loads map data 226 in a package which is delivered to map service 50 to be incorporated into local maps.

Incoming data at map service 50 is received at map data processing unit 250. Map data processing unit first checks account administration to verify that PSAP 30 has an account with map service 50. Assuming that PSAP 30 has an account with map service 50, map data processing 250 stores the incoming data from administrative server 224 on local database 254. Map data processing unit 250 then reconciles the new local data 254 with commercial data on databases 256-1 and 256-2. Local databases 256-1 and 256-2 are commercially available databases provided by data supplier 1 and data supplier 2 respectively. Map data processing unit 250 then performs a rules-based reconciliation of local data and commercial data. According to this exemplary embodiment, commercial databases 256-1 and 256-2 are given priority for geo-locations (i.e., latitude and longitude) and local data 254 is assumed to be correct for local names, land marks and new features.

After the data reconciliation, map data processing unit 250 stores the map on national map data server 260. National map data server 260 includes all map data for all subscribers to this service, regardless of their location. Map data processing unit 250 then sends the reconciled map data back through data network 40 to administrative server 224, which then stores the new map data in map data 226.

Briefly returning to FIG. 1, it is now clear that any local PSAP may back up any other PSAP and still be able to provide directional information to police, fire or other services. Therefore, if call handling switch 24 or 911 tandem 20 PSAP 30 within Region 114 is temporarily unavailable, PSAP 34 can handle all 911 calls with minimal rerouting through PSTN 12 by PSAP 34 requesting the map data for PSAP 30 from map service 50.

Figure 3A:
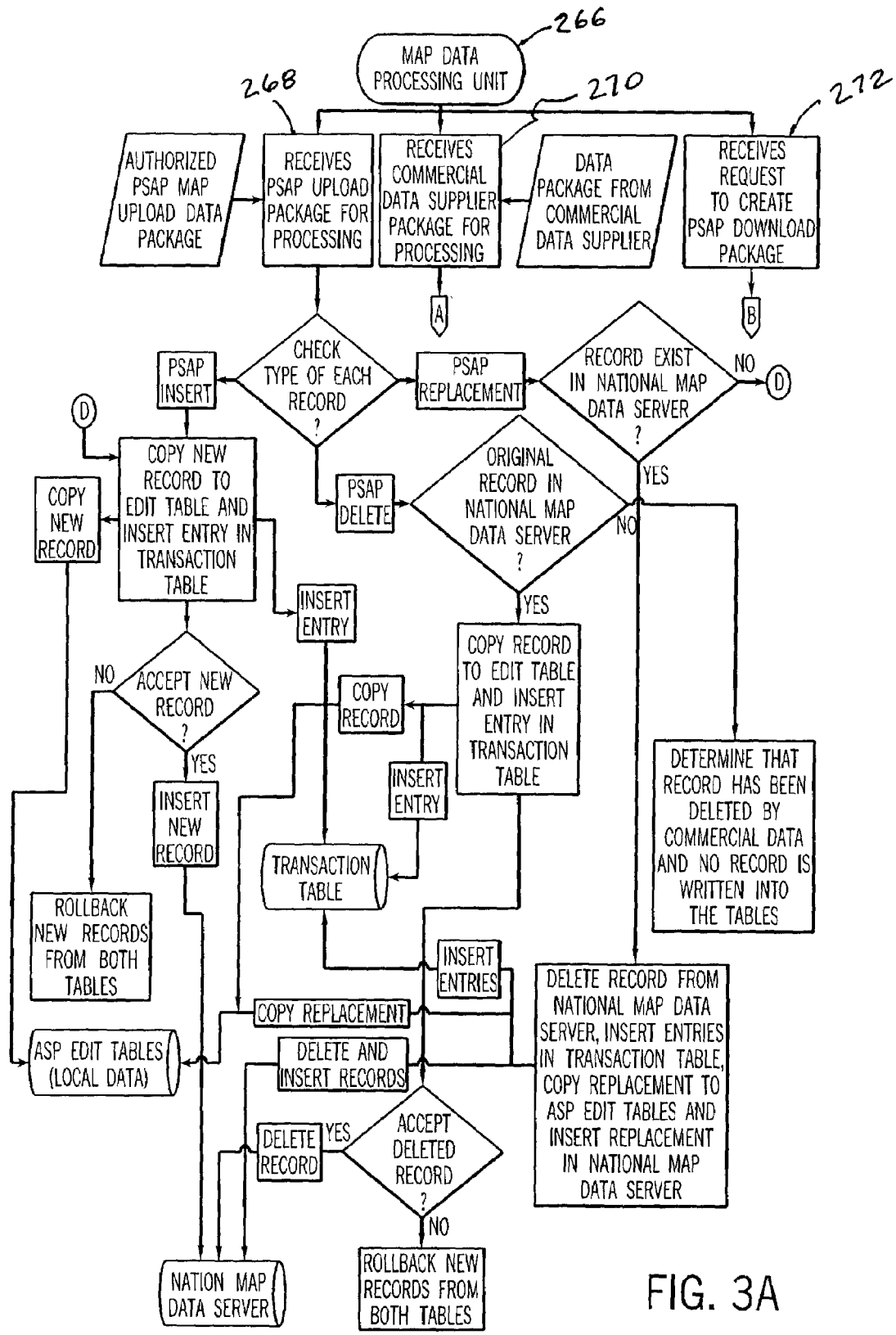
FIG. 3 is a flow chart of operation at the centralized map generation facility according to an exemplary embodiment of this invention.
Figure 3B:
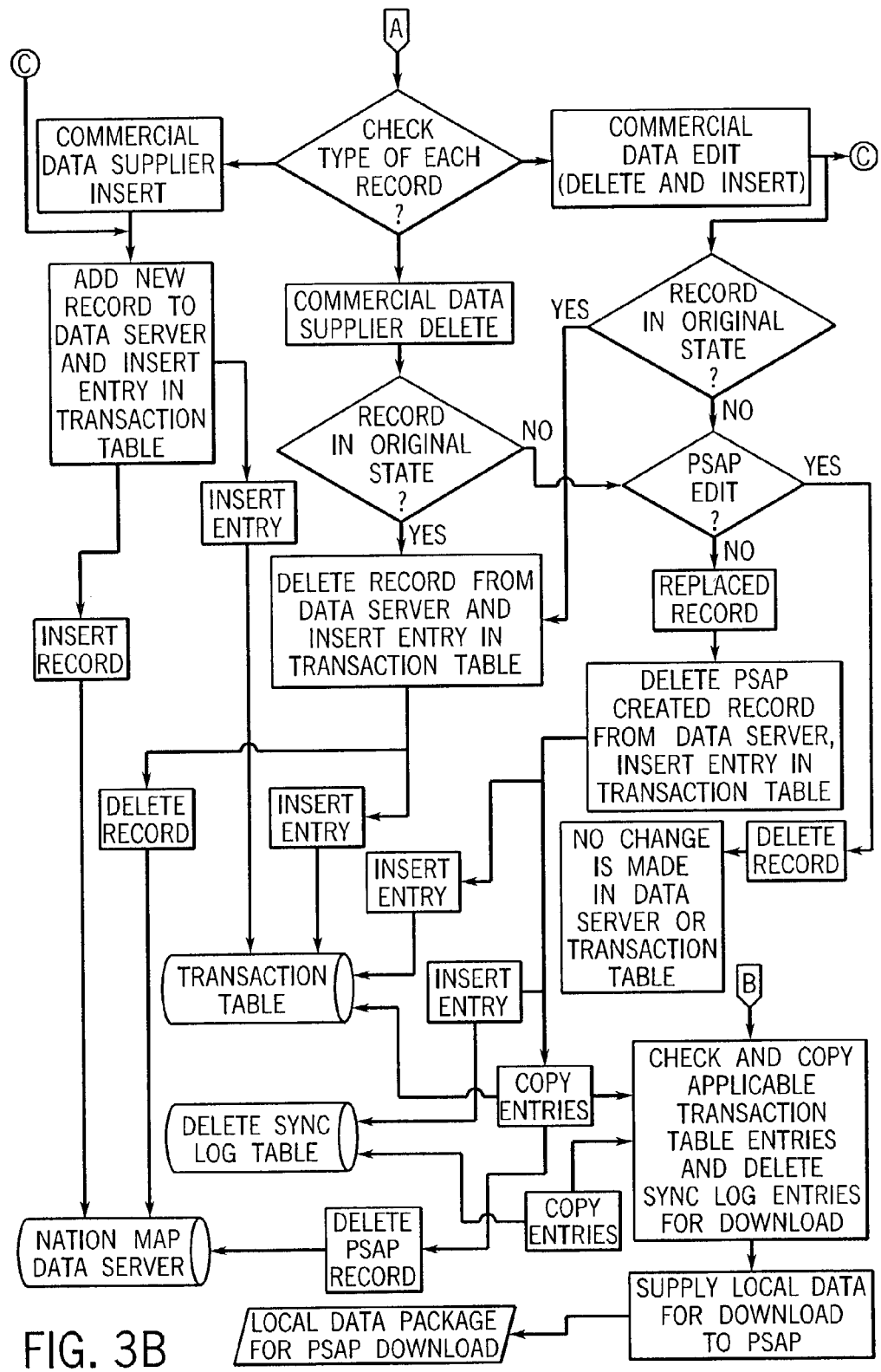

FIG. 3 shows a flow chart of operation at the centralized map generation facility according to an exemplary embodiment of this invention. The method begins at step 266, the map data processing unit, and a step 268 the a synchronization process begins with the process receiving the PSAP upload package for processing. The steps following from step 268 include the processing of the PSAP edits with entries as appropriate in the transaction table, ASP edit tables and the national map data server. At step 270, the reconciliation is processed resulting in an output to step 272 with new data in a local data package for PSAP download.

It is to be understood that the above-described invention embodiments are merely aspects of the invention and that many variations may be made by those skilled in the art. It is, therefore, intended that such variations be included within the scope of the following claims.

What is claimed is:

1. A method for updating map data comprising the steps of:
  receiving first data from a storage component in response to a first request that comprises first location information associated with a geographic location, wherein the first data comprises first geo-coordinates;
  generating a first map, that comprises a representation of the geographic location, based on the first data;
  determining local geographical data that is distinct from the first data and associated with the geographic location for the first map;
  determining second geo-coordinates of the local geographical data for inclusion on said first map;
  storing the local geographical data in the storage component;
  performing a rules-based comparison of the first geo-coordinates with the second geo-coordinates;
  receiving second data, that comprises the local geographic data, from the storage component in response to a second request that comprises second location information that is associated with the geographic location; and
  generating a second map, that comprises the local geographic data and the representation of the geographic location, based on the second data.

2. A method in accordance with claim 1 wherein said step of determining comprises collecting local geographical data that is inconsistent with said first map.

3. A method in accordance with claim 1 wherein said step of determining comprises collecting geographical data not included on said first map.

4. A method in accordance with claim 1 wherein said storing further comprises presuming that the first geo-coordinates of the first data take precedence over the second geo-coordinates of said local geographical data.

5. A method in accordance with claim 1 wherein said storing further comprises presuming that the local geographical data takes precedence over the first data.

6. A method in accordance with claim 1 wherein said step of determining local geographical data comprises collecting said local geographical data in a local data base.

7. A method in accordance with claim 1 wherein said step of generating the first map comprises generating the first map from commercial data at a central location.

8. A method in accordance with claim 7 wherein said step of determining local geographical data comprises collecting said local geographical data in a local data base.

9. A method in accordance with claim 8 wherein said step of storing comprises sending said collected local geographic data in said local data base to said central location.

10. A method in accordance with claim 9 further comprising the step of downloading the second map that comprises the local geographical data to a local user near the geographic location.

11. The method of claim 1, wherein the first location information comprises geo-coordinates of a first user located near the geographic location, wherein the second location information comprises geo-coordinates of a second user located near the geographic location, wherein the step of receiving the first data from the storage component in response to the first request that comprises the first location information associated with the geographic location comprises the step of:
  receiving first data from a storage component in response to a first request that comprises the geo-coordinates of the first user located near the geographic location;
  wherein the step of receiving the second data, that comprises the local geographic data, from the storage component in response to the second request that comprises the second location information that is associated with the geographic location comprises the step of:
  receiving second data, that comprises the local geographic data, from the storage component in response to a second request that comprises the geo-coordinates of the second user located near the geographic location.

12. The method of claim 11, wherein the first user and/or the second user comprise one or more of police, fire, and/or emergency workers, wherein the step of receiving the first data from the storage component in response to the first request that comprises the geo-coordinates of the first user located near the geographic location comprises the step of:
  receiving first data from the storage component in response to a first request that comprises the geo-coordinates of a one or more of police, fire, and/or emergency workers located near the geographic location;
  wherein the step of receiving the second data, that comprises the local geographic data, from the storage component in response to the second request that comprises the geo-coordinates of the second user located near the geographic location comprises the step of:
  receiving second data from the storage component in response to a second request that comprises the geo-coordinates of one or more of police, fire, and/or emergency workers located near the geographic location.

13. The method of claim 1, further comprising the steps of: receiving an upload package that comprises the local geographical data for one or more maps from a regional server;
  storing the local geographical data in the storage component;
  updating a national map for the one or more maps with the local geographical data of the upload package to create an updated national map; and
  downloading the updated national map to one or more regional servers.

14. The method of claim 13, wherein the upload package of data comprises local geographical data for the one or more maps, wherein the step of updating the national map for the one or more maps with the data of the upload package to create the updated national map comprises the step of:
  performing a rules-based comparison of the local geographical data with commercial data for the one or more maps; and
  updating the national map with the local geographical data.

15. The method of claim 1, wherein the local geographical data comprises one or more of a local name, land mark, road, road sign, and/or map feature.

16. The method of claim 15, wherein the local geographical data comprises geo-coordinates for the one or more of the local name, land mark, road, road sign, and/or map feature.

17. An apparatus for generating maps comprising:
means for receiving first data from a storage component in response to a first request that comprises first location information associated with a geographic location, wherein the first data comprises first geo-coordinates;
means for generating a first map, that comprises a representation of the geographic location, based on the first data;
means for receiving local geographical data that is distinct from the first data and associated with the geographic location for the first map;
means for determining second geo-coordinates of the local geographical data for inclusion on said first map;
means for storing the local geographical data in the storage component;
means for performing a rules-based comparison of the first geo-coordinates with the second geo-coordinates;
means for receiving second data, that comprises the local geographic data, from the storage component in response to a second request that comprises second location information that is associated with the geographic location; and
means for generating a second map, that comprises the local geographic data and the representation of the geographic location, based on the second data received.

18. An apparatus in accordance with claim 17 further comprising means for transmitting the first map and the second map to one or more local users.

19. An apparatus in accordance with claim 18 wherein said means for transmitting transmits a portion of the first map to each of said local users.

20. An apparatus in accordance with claim 18 wherein said means for transmitting transmits a portion of said first map to each of said local users responsive to a selection by said local users.

21. The apparatus of claim 17, wherein the first location information comprises geo-coordinates of a first user located near the geographic location, wherein the second location information comprises geo-coordinates of a second user located near the geographic location.

22. The apparatus of claim 21, wherein the first user and/or the second user comprise one or more of police, fire, and/or emergency workers.

23. The apparatus of claim 21, wherein the geo-coordinates of the first user and the geo-coordinates of the second user comprise substantially same geo-coordinates.

24. The apparatus of claim 13, further comprising:
means for receiving an upload package, of local geographical data for one or more maps, from a regional server;
means for storing said local geographical data with the one or more maps;
means for updating a national map for the one or more maps with the local geographical data of the upload package to create an updated national map; and
means for downloading the updated national map to one or more regional servers.

25. The apparatus of claim 17, wherein the local geographical data comprises one or more of a local name, land mark, road, road sign, and/or map feature.

26. The apparatus of claim 25, wherein the local geographical data comprises geo-coordinates forte one or more of the local name, land mark, road, road sign, and/or map feature.

27. A method for updating map data comprising the steps of:
receiving an upload package, of local geographical data for one or more maps, from a regional server, wherein the upload package of data comprises local geographical data for the one or more maps;
storing said local geographical data with the one or more maps;
performing a rules-based comparison of the local geographical data with commercial data for the one or more maps;
updating a national map for the one or more maps with the local geographical data of the upload package to create an updated national map; and
downloading the updated national map to one or more regional servers.

* * * * *